May 17, 1949. H. A. ALTORFER 2,470,126
TURBINE CONSTRUCTION
Filed Dec. 5, 1942 2 Sheets-Sheet 1

Inventor
H. A. Altorfer
by K. S. Wyman
Attorney

May 17, 1949.  H. A. ALTORFER  2,470,126
TURBINE CONSTRUCTION

Filed Dec. 5, 1942  2 Sheets-Sheet 2

Inventor
H. A. Altorfer
by K. S. Wyman
Attorney

Patented May 17, 1949

2,470,126

UNITED STATES PATENT OFFICE 2,470,126

TURBINE CONSTRUCTION

Hans A. Altorfer, Wauwatosa, Wis., assignor to Allis-Chalmers Manufacturing Company, Milwaukee, Wis., a corporation of Delaware Application December 5, 1942, Serial No. 467,964

18 Claims. (Cl. 60—41)

This invention relates generally to elastic fluid turbines and more particularly to the construction and mounting of high temperature turbine cylinder or casing structures embodying axially spaced spindle or rotor supporting bearings therein.

The invention is particularly applicable, although in no manner limited, to the construction of axial flow elastic fluid turbines in which the casing structure enclosing and supporting in whole or in part the spindle or rotor is or is likely to be heated sufficiently to render the structure incapable of withstanding the stresses set up therein by the relative radial and axial expansion of interconnected parts. Under such conditions the casing or cylinder structures heretofore employed usually become deformed sufficiently to produce misalinement of the axially spaced spindle or rotor supporting bearings and the result is a rough running machine requiring frequent attention and replacement of parts. In some instances the deformation is or may be sufficient to produce rubbing contact between normally spaced stationary and moving parts and consequently considerable damage to the machine.

It is therefore the primary object of this invention to provide an improved high temperature turbine cylinder or casing structure which will effect a sufficient reduction in the aforementioned expansion produced stresses to substantially eliminate the damaging deformations attributable to such stresses.

Another object of this invention is to provide a compact, simplified and durable turbine cylinder or casing structure which is capable of safely withstanding extremely high temperatures and which can be readily manufactured and properly installed with a minimum of time and expense.

In accordance with this invention, one or more of the above stated objects may be accomplished by mounting a peripheral portion of the turbine cylinder or casing structure intermediate its ends on a series of circumferentially spaced supports for radial expansion and contraction relative thereto with the portions of the structure on either side of said peripheral portion substantially free to expand and contract longitudinally with respect to said peripheral portion and with respect to said supports, and if the inlet portion of the cylinder or casing structure attains a temperature considerably higher than that of said intermediate portion, to provide an additional means connecting said inlet portion to said intermediate portion for radial expansion and contraction relative thereto.

The invention accordingly consists of the various features of construction, combinations of elements, and arrangements of parts as is more fully set forth in the appended claims and in the detailed description, reference being had to the accompanying drawings, in which:

Figures 1, 2:
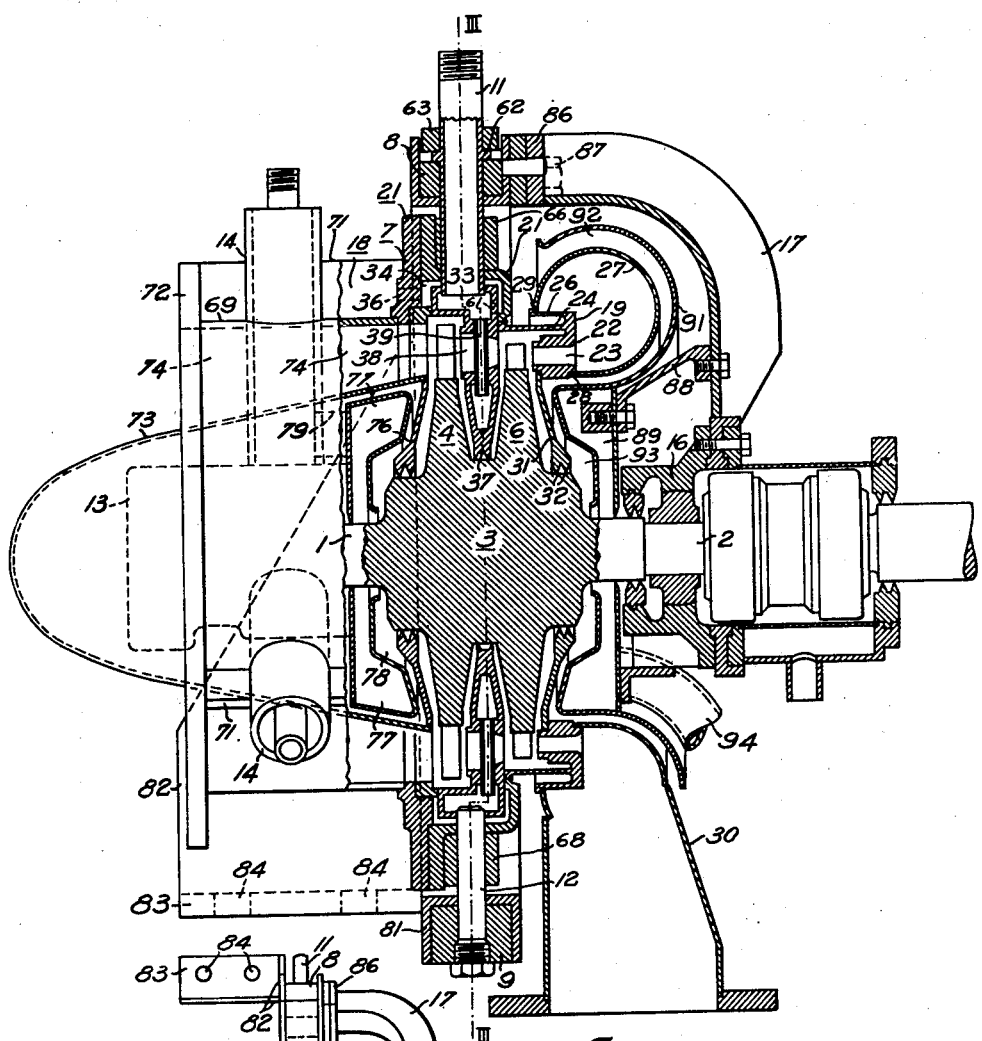
Fig. 1 is a side elevation, partly in section, illustrating a turbine structure embodying the invention.
Fig. 2 is a plan view illustrating the manner of mounting the fixed supports.
Figure 3:
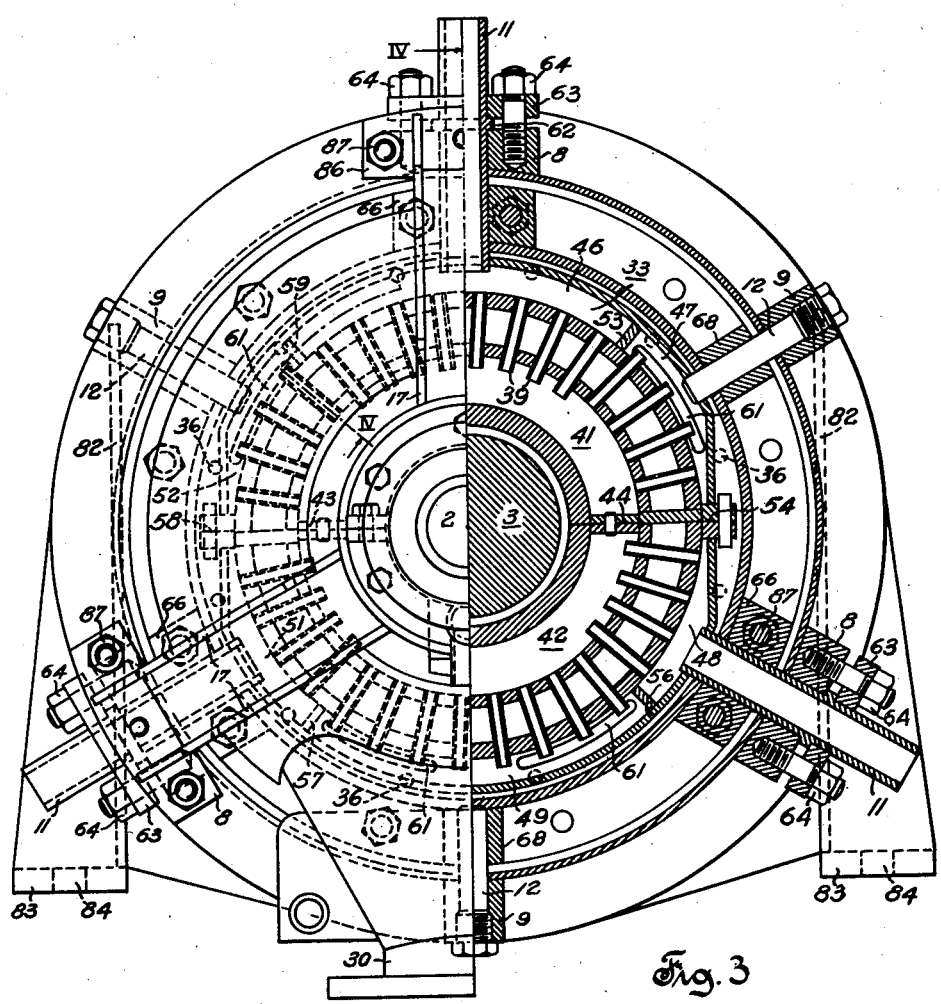
Fig. 3 is an inlet end view in half transverse section taken on line III—III of Fig. 1.

Referring to Figs. 1, 2 and 3 of the drawings, it is seen that a turbine structure embodying the invention may include a rotor having coaxially spaced shaft portions 1 and 2 and an intermediate blade carrying portion 3 presenting axially spaced blade carrying disk portions 4 and 6, an elongated casing 7 surrounding the shaft portion 1 and the intermediate portion 3 of said rotor, a series of circumferentially spaced, fixed supports 8 and 9 surrounding and being spaced from the periphery of an intermediate portion of said casing, a plurality of radially extending members 11 and 12 connecting the periphery of said intermediate portion of the casing 7 with the fixed supports 8 and 9, respectively, a bearing 13 rotatably mounting the shaft portion 1 of said rotor, said bearing being in turn coaxially supported by a plurality of radially extending members 14 mounted on the adjacent end of the casing 7, and a bearing 16 rotatably supporting the shaft portion 2 of said rotor, said bearing being in turn coaxially supported on a plurality of radially extending members 17 carried by the fixed supports 8. The casing 7 comprises an exhaust portion 18, an inlet portion 19 and an intermediate portion 21; said portions being integrally united to form a unitary structure with its inlet and intermediate portions surrounding the blade carrying portion 3 of the rotor and with its exhaust portion surrounding the shaft portion 1 of the rotor and the bearing 13 rotatably supporting same.

The inlet portion 19 of the casing 7 includes a nozzle structure embodying an annular coaxial body portion 22 having one or more nozzle passages 23 extending therethrough and radially flexible inner and outer annular members 24 and 26 projecting from said body portion in coaxial spaced relation with respect to each other and with respect to the nozzle passage containing part of said body portion. The inner member 24, which is of greater axial length than either the member 26 or the nozzle passage containing part of the body portion 22, surrounds the latter and the blade carrying disk portion 6 of the rotor and unites the nozzle structure with the adjacent side of the intermediate casing portion 21 as shown in Fig. 1. The inlet side of the nozzle structure is enclosed by an annular inlet manifold forming member 27 having radially spaced coaxial edges, one of which, 28, is united with the inner edge of the nozzle body portion 22 and the other of which, 29, is united with the free end of the member 26. Member 27 may be provided with a suitable motive inlet connection 30. An annular shielding and sealing disk 31 has its outer edge united with the inner peripheral portion of the nozzle passage containing part of the nozzle body adjacent the discharge end of the nozzle passage and has its inner edge provided with annular sealing projections 32 which coact with a peripheral portion of the turbine rotor.

The radially flexible member 24 permits the highly heated inlet portion 19 to expand and contract radially relative to the intermediate portion 21 and the radially flexible member 26 permits the highly heated inlet manifold forming member 27 to expand and contract radially relative to the nozzle body portion 22. In addition, it should now be obvious that the entire inlet portion 19 is substantially free to expand and contract longitudinally relative to the intermediate portion 21.

Figure 4:
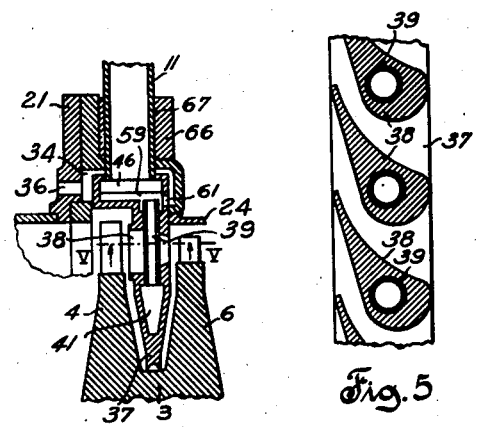
Fig. 4 is a partial section taken on line IV—IV of Fig. 3.
Figure 5:
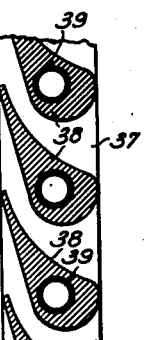
Fig. 5 is a partial section taken on line V—V of Fig. 4.

The intermediate portion 21, reference being also had to Figs. 4 and 5, is fabricated or otherwise formed to provide an inner annular cooling fluid space 33, an outer surrounding cooling fluid chamber 34 which communicates with the atmosphere through an annular series of ports or openings 36, and a hollow diaphragm disk member 37 which is disposed between the rotor blade carrying disks 4 and 6 and which has embodied therein an annular series of fluid turning vane elements 38 provided with ducts 39 extending radially therethrough and placing the hollow interior of the disk member 37 in communication with the space 33. The hollow interior of the disk member 37 is divided into two compartments 41 and 42 by means of the partitions 43 and 44 and the space 33 is divided into six arcuate shaped chambers 46, 47, 48, 49, 51 and 52 by means of the radially extending partitions 53, 54, 56, 57, 58 and 59. The chambers 47, 49 and 52 communicate with the cooling fluid discharge chamber 34 by means of arcuate shaped ports 61. Cooling fluid entering the chamber 46 flows through the group of connecting ducts 39 into the compartment 41 and from there through the groups of connecting ducts 39 into the chambers 47 and 52, then through the ports 61, the discharge chamber 34 and to atmosphere through the ports 36. Cooling fluid entering the chambers 48 and 51 flows through the groups of connecting ducts 39 into the compartment 42, and from there through the group of connecting ducts 39 into the chamber 49 and then through the ports 61, the discharge chamber 34 and to atmosphere through the ports 36.

Cooling fluid enters the chambers 46, 48 and 51 of the space 33 through the connecting members 11 which are preferably formed as tubular fluid conductors having flanged outer ends 62 clamped to the fixed supports 8 by means of cap members 63 and bolts 64. The intermediate portion 21 is provided with radially alined openings in the walls of the chambers 34, 46, 48 and 51 opposite the fixed supports 8 for slidably receiving therein the inner end portions of the connecting members 11 which terminate within the chambers 46, 48 and 51 as shown, thereby placing said chambers in communication with a suitable source of cooling fluid (not shown) with which the outer ends of the members 11 may be connected. The intermediate portion 21 is also provided on its periphery with additional means slidably receiving and guiding the members 11 through the alined openings in the walls of the chambers 34, 46, 48 and 51; said additional means being in the nature of fabricated bosses 66 each having an opening 67 extending radially therethrough in alinement with the alined openings in the walls of said chambers. The connecting members 12 are in the nature of solid pins which are secured to the fixed supports 9 and extend through guide members in the nature of bushings 68 secured to the intermediate portion 21 opposite the fixed supports 9 and through radially alined openings in the walls of the chambers 34, 47, 49 and 52. The members 11 and 12 are connected with the periphery of the intermediate portion 21 for relative sliding radial movement and it should therefore be obvious that the intermediate portion 21 of the casing 7 is free to expand and contract radially relative to the fixed supports 8 and 9, that the members 11 and 12 are substantially rigid and thereby prevent longitudinal movements of the intermediate portion 21 relative to the fixed supports 8 and 9, and that the flow of cooling fluid through the members 11 and the chambers 34, 46, 47, 48, 49, 51 and 52 maintains the fixed supports and the intermediate portion of the casing relatively cool and renders said supports and intermediate portion capable of withstanding the stresses to which they may be subjected. In this connection, the fixed supports 9, the members 12 and the bushings 68 primarily function as additional guide means and insofar as their supporting function is concerned, may be omitted, if desired.

The exhaust portion 18 comprises an annular shell 69 integrally united in coaxial relation with the exhaust side of the intermediate portion 21 and having thereon a series of circumferentially spaced, axially extending strengthening ribs 71 and an outwardly extending annular end strengthening flange 72. The supports 14 for the bearing 13, which are preferably formed as hollow fluid conductors, have their outer end portions united with the ribbed portion of the shell 69 and extend therethrough for connection with a suitable source of cooling and/or lubricating fluid (not shown) for the bearing 13. The bearing 13 is preferably enclosed in an annular shell 73 which is carried by the supports 14 mounting the bearing 13 coaxially within the shell 69 and which forms with the shell 69 an annular exhaust gas passage 74 receiving the motive fluid issuing from the blades mounted on the rotor disk 4. The inner end of the shell 73 has mounted therein an annular shielding and sealing disk 76 disposed adjacent the blade carrying disk 4. The inner end portions of the supports 14 also have mounted thereon means defining a coaxial cooling fluid chamber 77 which is interposed between the bearing 13 and the disk 76 and which forms with the latter an annular cooling fluid passage 78 communicating at its inner end with the chamber 77 and at its outer end with the space between the shell 73 and the bearing 13. The chamber 77 may be supplied with cooling fluid by flowing same through the supports 14 and through the axially extending connections 79 mounting the means defining the chamber 77 on the supports 14. The details of the bearing construction and the means supporting, cooling and shielding same form no part of this invention, and a further disclosure in this connection is deemed unnecessary. However, it should now be obvious that, although the exhaust end portion 18 of the casing 7 does support the bearing 13, the exhaust end portion 18 together with the parts carried thereby are substantially free to expand and contract longitudinally with respect to the fixed intermediate portion 21 while the entire casing 7 is substantially free to expand and contract radially as a unit relative to the fixed supports 8 and 9.

The fixed supports 8 and the fixed supports 9 for the guiding connections 12 are, in this illustration, carried by a channel shaped ring member 81 (see Fig. 2) which is in turn fixedly mounted on a suitable foundation or the like (not shown) by means of depending leg portions 82 and terminal feet or base members 83 having bolt holes 84 extending therethrough for securing the members 83 to the foundation. The channel shaped members 17 mounting the bearing 16 have outer flanged ends 86 which may be removably secured to the side of the ring member 81 adjacent the supports 8 by any suitable means such as the bolts 87. The members 17 also have mounted thereon, as by means of brackets 88, means defining an annular cooling fluid chamber 89 interposed between the disk 31 and the bearing 16; said means including an outer curved wall portion 91 disposed in spaced surrounding relation about the inlet manifold 27 and forms therewith a cooling fluid passage 92 communicating at its outer end with the atmosphere and at its inner end with the space or passage 93 which in turn communicates at its inner end with the inner end of the chamber 89 into which cooling fluid from a suitable source (not shown) may be conducted through the pipe 94. This construction effectively shields the supporting members 17 and the bearing 16 from the highly heated intake manifold 27 and from the highly heated adjacent portions of the rotor. In addition, the inlet portion 19 of the casing 7 is substantially free to expand and contract both radially and longitudinally with respect to the means defining the cooling fluid chamber 89 and including the wall portion 91 as well as with respect to the intermediate portion 21 of the casing 7.

Certain features relating to constructions and arrangements, disclosed but not claimed herein, comprising bearings, lubricating and/or cooling means therefor, are claimed in the copending applications of J. A. Johnson, S. N. 466,549, filed November 23, 1942, now Patent No. 2,414,814, and H. A. Altorfer and J. A. Johnson, S. N. 466,610, filed November 23, 1942, now Patent No. 2,414,788.

The illustrative construction hereinbefore described provides a compact, simplified and durable high temperature turbine cylinder or casing structure and a supporting means therefor embodying arrangements of parts and/or combinations of elements correlated to effect a sufficient reduction in the expansion produced stresses set up in interconnected parts to substantially eliminate the damaging deformation and strains attributable to such stresses. The invention is of general application to elastic fluid turbine structures and, although the invention has been illustrated and described as applied to an axial flow multistage turbine, it should be understood that it is not desired to limit the invention to the exact details of construction herein shown and described as various modifications within the scope of the appended claims may occur to persons skilled in the art.

It is claimed and desired to secure by Letters Patent:

1. A turbine structure comprising a rotor, an elongated annular casing surrounding said rotor and having an intermediate portion embodying a jacketed construction providing a cooling fluid space surrounding a blade carrying portion of said rotor, a series of circumferentially spaced, fixed supports coaxially surrounding and being spaced from the periphery of said intermediate portion, and a radially extending cooling fluid conductor carried by each support and having its inner end portion slidably extending through a radially opposed part of said intermediate portion and into said cooling fluid space, said supports and conductors mounting said intermediate portion for radial expansion and contraction relative to said supports and conductors with the portions of said casing on either side of said intermediate portion substantially free to expand and contract longitudinally with respect to said intermediate portion and with respect to said supports and conductors.

2. A turbine structure comprising a rotor having axially spaced blade rows, an elongated annular casing surrounding said rotor and having an intermediate portion carrying a diaphragm disk disposed between two of said blade rows, said intermediate portion embodying a jacketed construction providing a cooling fluid space surrounding the outer portion of said disk, a series of circumferentially spaced, fixed supports surrounding and being spaced from the periphery of said intermediate portion, and a radially extending cooling fluid conductor carried by each support and having its inner end portion slidably extending through a radially opposed part of said intermediate portion and into said space, said supports and conductors mounting said intermediate portion for radial expansion and contraction relative to said supports and conductors with the portions of said casing on either side of said intermediate portion substantially free to expand and contract longitudinally with respect to said intermediate portion and with respect to said supports and conductors.

3. A turbine structure comprising a rotor having axially spaced blade rows, an elongated annular casing surrounding said rotor and having an intermediate portion carrying a diaphragm disk disposed between two of said rows, said disk having a hollow partitioned interior and said intermediate portion embodying a jacketed construction providing a plurality of cooling fluid admission and discharge spaces surrounding the outer portion of said disk, means including the partitioned interior of said disk connecting groups of said spaces in series flow relation, a series of circumferentially spaced, fixed supports surrounding and being spaced from the periphery of said intermediate portion, and a radially extending cooling fluid conductor carried by each support and having its inner end portion slidably extending through a radially opposed part of said intermediate portion forming the outer wall of one of said cooling fluid spaces, said supports and conductors mounting said intermediate portion for radial expansion and contraction relative to said supports and conductors with the portions of said casing on either side of said intermediate portion substantially free to expand and contract longitudinally with respect to said intermediate portion and with respect to said supports and conductors.

4. A turbine structure comprising a rotor having axially spaced blade rows, an elongated annular casing surrounding said rotor and having an intermediate portion carrying a diaphragm disk disposed between two of said rows, said disk having a hollow partitioned interior and said intermediate portion embodying a jacketed construction providing a plurality of cooling fluid admission and discharge spaces surrounding said disk with portions of said discharge spaces also surrounding said fluid admission spaces, means including the partitioned interior of said disk connecting groups of said spaces in series flow relation, a series of circumferentially spaced, fixed supports surrounding and being spaced from the periphery of said intermediate portion, and a radially extending cooling fluid admission conductor carried by each support and having its inner end portion slidably extending through a radially opposed part of the outer periphery of said intermediate portion, through the portion of a cooling fluid discharge space surrounding a cooling fluid admission space, and into the latter, said supports and conductors mounting said intermediate portion for radial expansion and contraction relative to said supports and conductors with the portions of said casing on either side of said intermediate portion substantially free to expand and contract longitudinally with respect to said intermediate portion and with respect to said supports and conductors.

5. A turbine structure comprising a rotor, an elongated annular casing surrounding said rotor and having an intermediate portion embodying a jacketed construction providing a plurality of cooling fluid admission and discharge spaces with portions of said discharge spaces surrounding said fluid admission spaces, means connecting groups of said spaces in series flow relation, a series of circumferentially spaced, fixed supports surrounding and being spaced from the periphery of said intermediate portion, and radially extending cooling fluid conductors passing into said intermediate portion, through the portion of a cooling fluid discharge space surrounding a cooling fluid admission space and into the latter and supportingly connecting said intermediate portion with said supports for radial expansion and contraction relative thereto with the portions of said casing on either side of said intermediate portion substantially free for expansion and contraction longitudinally with respect to said intermediate portion and with respect to said supports.

6. A turbine structure comprising a rotor, an elongated annular casing surrounding said rotor and having an intermediate portion embodying a jacketed construction providing a cooling fluid space surrounding a blade carrying portion of said rotor, a series of circumferentially spaced, fixed supports surrounding and being spaced from said intermediate portion, and cooling fluid conductors communicating with said space and supportingly connecting the periphery of said intermediate portion with said supports for radial expansion and contraction relative thereto with the portions of said casing on either side of said intermediate portion substantially free to expand and contract longitudinally with respect to said intermediate portion and with respect to said supports.

7. A turbine structure comprising a rotor, an elongated annular casing surrounding said rotor, said casing having an intermediate portion embodying a jacketed construction providing a cooling fluid space surrounding a blade carrying portion of said rotor and having a coaxial inlet manifold and nozzle portion connected with said intermediate portion for radial expansion and contraction relative thereto, a series of circumferentially spaced, fixed supports surrounding and being spaced from said intermediate portion, and cooling fluid conductors communicating with said space and supportingly connecting the periphery of said intermediate portion with said supports for radial expansion and contraction relative thereto with the portions of said casing on either side of said intermediate portion substantially free to expand and contract longitudinally with respect to said intermediate portion and with respect to said supports.

8. In a turbine having a rotor, a casing adapted to surround the blade carrying portion of the rotor comprising an annular shell, a nozzle structure embodying a body portion, a first radially flexible annular member coaxially projecting from and uniting said body portion with said shell, and a second radially flexible annular member coaxially projecting from said body portion in spaced surrounding relation with respect to said first member and in spaced relation with respect to the adjacent end of said shell, and an annular motive fluid conducting manifold enclosing the inlet portion of said nozzle structure and being supported thereon for radial expansion and contraction relative to said body portion by having radially spaced edges of which its inner edge is secured to said body portion and its outer edge is secured to the free end portion of said second member.

9. In a turbine having a rotor, a casing adapted to surround the blade carrying portion of the rotor comprising an annular shell, a nozzle structure embodying a body portion and concentric radially flexible annular members of different lengths with the longer one of said members coaxially uniting said nozzle structure with said shell, and an annular motive fluid conducting manifold enclosing the inlet portion of said nozzle structure and being supported thereon for radial expansion and contraction relative thereto by having radially spaced edges one of which is secured to said body portion and the other of which is secured to the free end portion of the shorter one of said members.

10. A turbine construction comprising a rotor, a casing for said rotor including an intermediate portion embodying a jacketed construction providing a cooling fluid space surrounding a blade carrying portion of said rotor, fixed supporting means disposed adjacent the periphery of said intermediate portion, cooling fluid conductors communicating with said space and supportingly mounting said intermediate portion on said fixed supporting means for radial expansion and contraction relative thereto with the portions of said casing on either side of said intermediate portion substantially free to expand and contract longitudinally relative to said intermediate portion and relative to said supports.

11. A turbine construction, comprising: a rotor; and casing means including, a main portion surrounding the blade carrying portion of said rotor, an assembly including a nozzle portion and an inlet manifold therefor, and flexible passage forming means interposed between and fluid-confiningly connecting said main portion and said assembly and supporting said assembly from said main portion for relative radial expansion and contraction.

12. A turbine construction, comprising: a rotor; and casing means including, a main portion surrounding the blade carrying portion of said rotor, a nozzle portion coaxial with said main portion, and flexible passage forming means coaxial with said main and nozzle portions interposed between and fluid-confiningly connecting said main portion and said nozzle portion and supporting said nozzle portion from said main portion for relative radial expansion and contraction.

13. In a turbine having a rotor, a casing adapted to surround the blade carrying portion of the rotor comprising an annular shell structure, a nozzle structure, flexible means coaxially mounting said nozzle structure on said shell structure for radial movement relative thereto, a coaxial motive fluid conducting manifold enclosing the inlet portion of said nozzle structure, flexible means supportingly mounting said manifold on said nozzle structure for radial movement relative thereto, fixed supporting means disposed adjacent the periphery of said shell structure, and means mounting said shell structure on said supporting means in a manner rendering said shell structure movable radially and immovable longitudinally relative to said supporting means.

14. In a turbine having a rotor, a casing adapted to surround the blade carrying portion of the rotor comprising an annular shell structure, a nozzle structure, flexible means coaxially mounting said nozzle structure on said shell structure for radial movement relative thereto, a coaxial motive fluid conducting manifold enclosing the inlet portion of said nozzle structure, and flexible means mounting said manifold on said nozzle structure for radial movement relative to said nozzle structure.

15. A turbine construction comprising a rotor, a rotor enclosing casing including a main portion surrounding the blade carrying portion of the rotor, a nozzle portion and a radially flexible annular supporting member coaxially uniting said main and nozzle portions, fixed supporting means disposed adjacent said main portion, and means mounting said main portion on said fixed supporting means in a manner rendering said main portion movable radially and immovable longitudinally relative to said fixed supporting means with said annular member and nozzle portion substantially free to expand and contract longitudinally relative to said intermediate portion.

16. A turbine construction comprising a rotor, a rotor enclosing casing including a main portion surrounding the blade carrying portion of the rotor, a nozzle portion and a flexible intermediate portion coaxially uniting said main and nozzle portions for relative radial movement, fixed supporting means disposed adjacent said main portion, and means mounting said main portion on said fixed supporting means in a manner rendering said main portion movable radially and immovable longitudinally relative to said fixed supporting means with said intermediate and nozzle portions substantially free to expand and contract longitudinally relative to said intermediate portion.

17. In a turbine structure having a rotor and a rotor enclosing casing including a coaxially arranged nozzle structure, means enclosing the inlet portion of said structure comprising an annular motive fluid conducting manifold, and at least one flexible wall coaxially uniting said manifold and nozzle structure for relative radial expansion and contraction.

18. In a turbine structure having a rotor and a rotor enclosing casing including a coaxially arranged nozzle structure, means enclosing the inlet portion of said structure comprising an annular motive fluid conducting manifold having spaced opposed edges of which one edge is secured directly to said nozzle structure, and a flexible wall uniting the other one of said edges with said nozzle structure for relative radial movement.

HANS A. ALTORFER.

REFERENCES CITED

The following references are of record in the file of this patent:

UNITED STATES PATENTS

| Number | Name | Date |
| --- | --- | --- |
| 830,393 | Wilkinson | Sept. 4, 1906 |
| 1,491,423 | Rice | Apr. 22, 1924 |
| 1,873,743 | Doran | Aug. 23, 1932 |
| 1,889,554 | Kennedy | Nov. 29, 1932 |

FOREIGN PATENTS

| Number | Country | Date |
| --- | --- | --- |
| 229,627 | Great Britain | Jan. 14, 1926 |
| 345,888 | Great Britain | Apr. 2, 1931 |
| 369,680 | Great Britain | Mar. 31, 1932 |
| 76,744 | Austria | June 10, 1919 |